United States Patent [19]

Davis et al.

[11] Patent Number: 4,707,257
[45] Date of Patent: Nov. 17, 1987

[54] AIR/WATER DISTRIBUTOR UNDERDRAIN

[75] Inventors: Thomas A. Davis, Annandale; Kurt Bozenmayer, West Milford; Donald J. Butterworth, Stirling, all of N.J.

[73] Assignee: The Graver Company, Union, N.J.

[21] Appl. No.: 868,649

[22] Filed: May 29, 1986

[51] Int. Cl.$^4$ ............................................. B01D 23/24
[52] U.S. Cl. ................................. 210/274; 210/275; 210/293
[58] Field of Search ........ 210/793, 794, 188, 274–278, 210/289, 291–293

[56] References Cited

U.S. PATENT DOCUMENTS

| 1,341,187 | 5/1920 | McPheeters | 210/293 |
|---|---|---|---|
| 1,584,102 | 5/1926 | Lee | 210/293 |
| 2,412,032 | 12/1946 | Bill, Jr. | 210/171 |
| 2,711,829 | 6/1955 | Hulsbergen | 210/171 |
| 2,928,419 | 3/1960 | Kruse | 137/593 |
| 3,110,667 | 11/1963 | Stuppy | 210/275 |
| 3,378,858 | 4/1968 | Jacuzzi | 4/172 |
| 3,530,989 | 9/1970 | Koethke | 210/188 |
| 3,615,019 | 10/1971 | Early, Jr. | 210/293 |
| 3,730,348 | 5/1973 | Weis et al. | 210/274 |
| 3,762,559 | 10/1973 | Knoy et al. | 210/293 |
| 3,780,869 | 12/1973 | Krongos | 210/317 |
| 3,956,134 | 5/1976 | Sturgill | 210/275 |
| 4,084,750 | 4/1978 | Fett | 210/293 X |
| 4,102,790 | 7/1978 | Portyrata | 210/293 |
| 4,133,766 | 1/1979 | Adie | 210/275 |
| 4,214,992 | 7/1980 | Sasano | 210/274 |
| 4,222,876 | 9/1980 | Englehart | 210/293 |
| 4,331,542 | 5/1982 | Emrie | 210/794 |
| 4,421,644 | 12/1983 | Gedye | 210/233 |
| 4,435,286 | 3/1984 | Louboutin et al. | 210/116 |
| 4,476,020 | 10/1984 | Cheetham | 210/289 |
| 4,604,197 | 8/1986 | Louboutin et al. | 210/274 X |

OTHER PUBLICATIONS

"Graver Roto-Scour Underdrain System" (1967).

Primary Examiner—Tom Wyse
Attorney, Agent, or Firm—Dressler, Goldsmith, Shore, Sutker & Milnamow, Ltd.

[57] ABSTRACT

An air/water distributor underdrain assembly for providing a uniform distribution and metering of backwash air and/or water through a filter bed. The distributor assembly includes a distributor member which defines a distributor chamber for receipt of backwash air and/or water thereinto. A plurality of first and second spaced apart openings extend through the distributor member. A shroud extends downwardly into the distributor chamber from each of the first openings in fluid communication with an intermediate portion of the distributor chamber for directing backwash water therethrough. Backwash air collected in a gas compartment formed in an upper portion of the distributor chamber is directed through the second openings.

25 Claims, 12 Drawing Figures

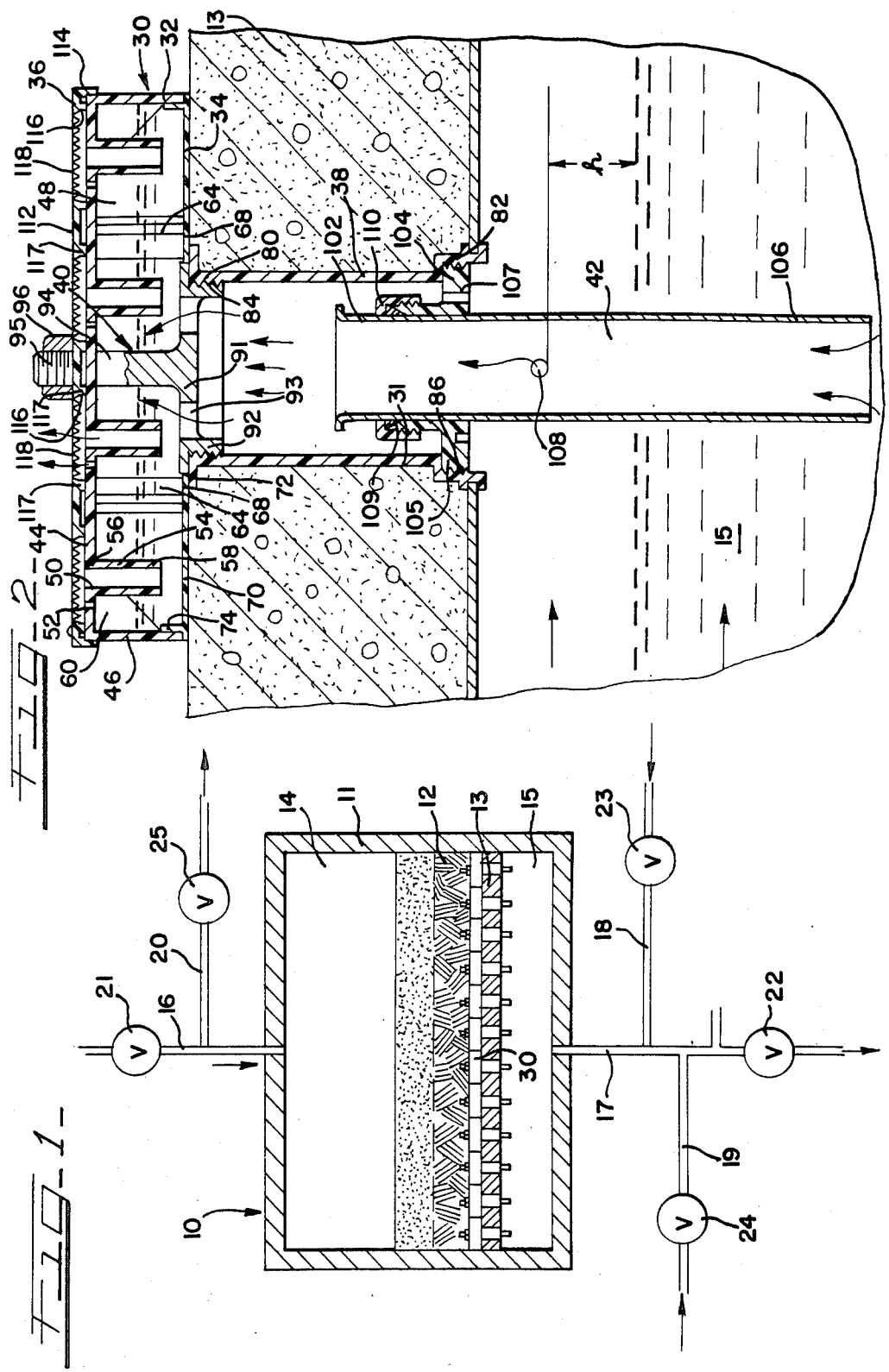

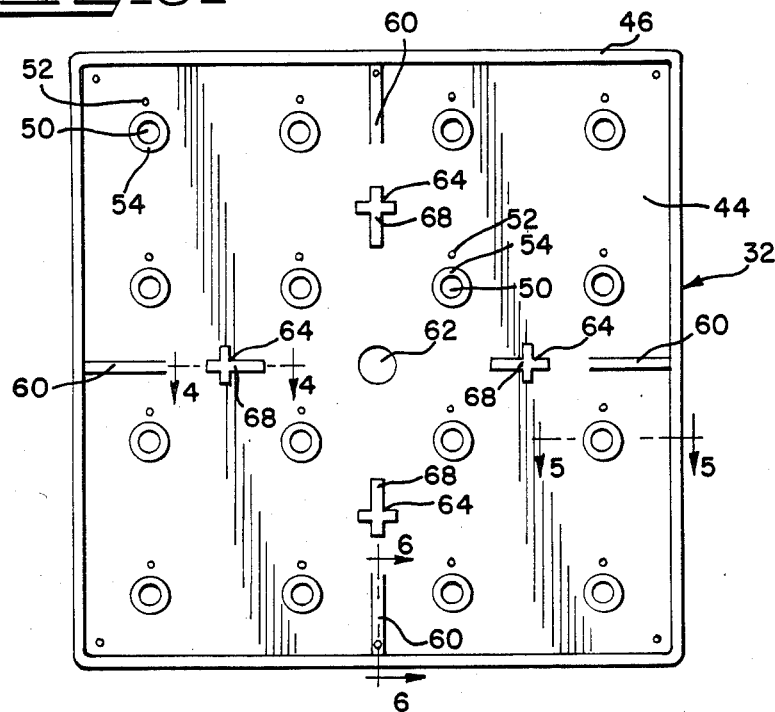
FIG-3-
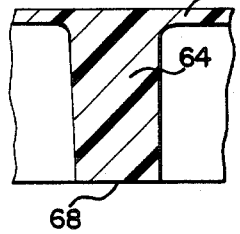
FIG-4-
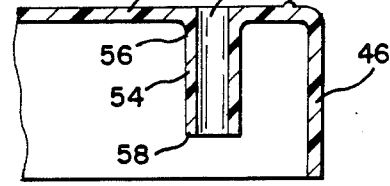
FIG-5-
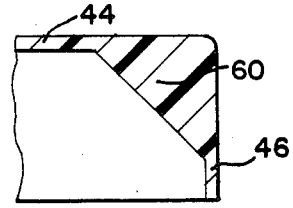
FIG-6-
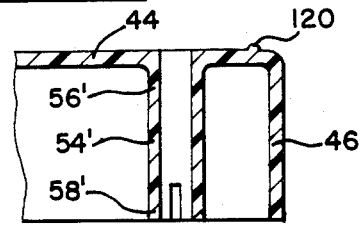
FIG-11-

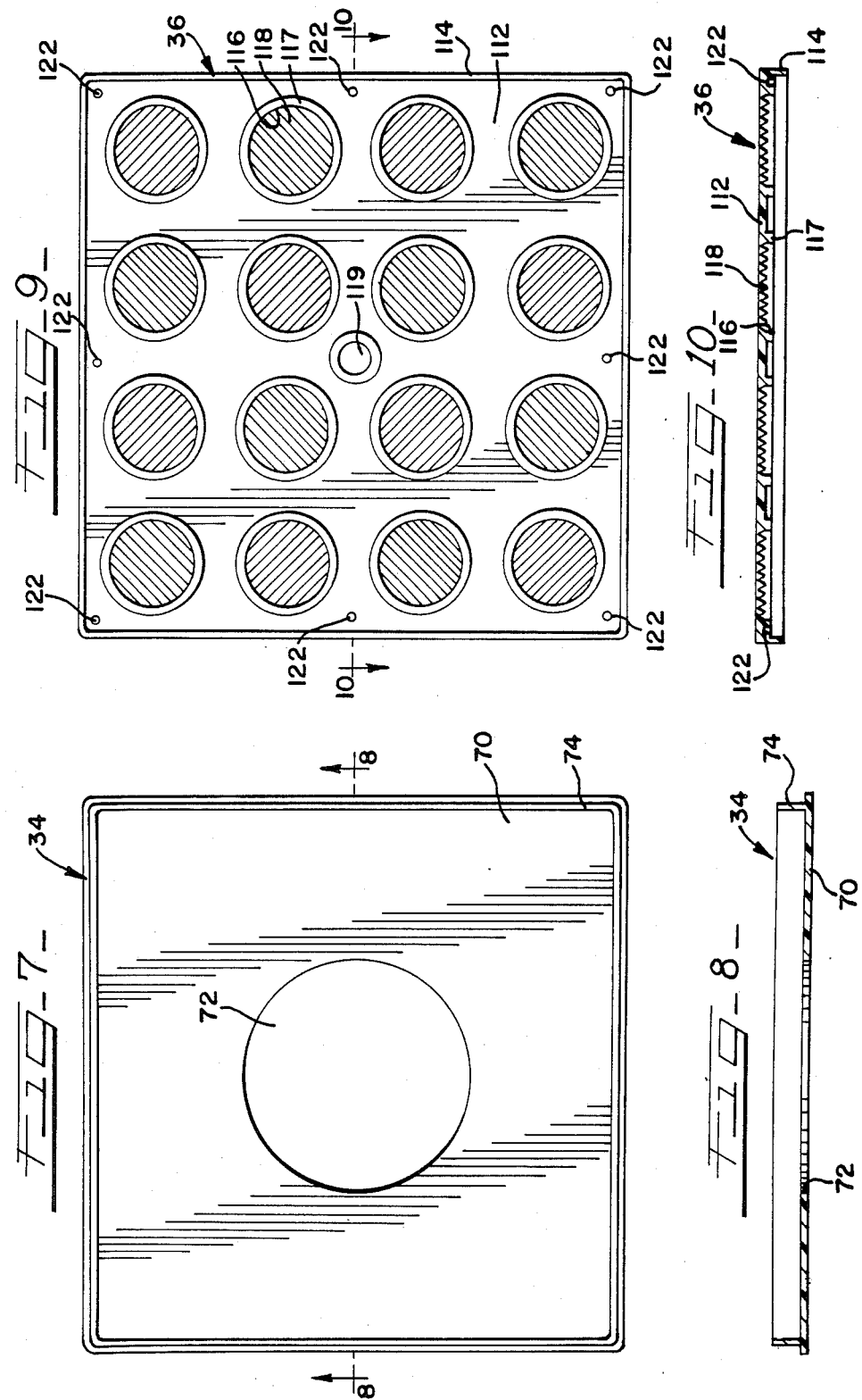

AIR/WATER DISTRIBUTOR UNDERDRAIN

BACKGROUND OF THE INVENTION

The present invention is directed to an underdrain distributor assembly for use in a liquid filter of the type having a granular filter bed through which the liquid to be treated flows downwardly therethrough.

Granular media filters, as used extensively for the purification of water, typically comprise a carefully graded particulate media filter bed of sand, anthracite, etc., which filter bed is supported above a floor positioned in a filter tank so as to divide the tank into an inlet chamber thereabove and an outlet chamber therebelow. In use, as the water to be treated is passed downwardly through the filter bed, the suspended solids are removed and retained within the granular media. Periodically, it is necessary to remove the suspended solids collected in the filter bed by backwashing the filter bed so as to preclude the filter from clogging and ceasing to properly function. Backwashing is conventionally achieved by passing backwash water upwardly through the filter media, preferably preceeded by or accompanied by a backwash gas such as air.

The collection of filtrate and the distribution of backwash air and/or water is commonly achieved by specially designed strainers or underdrain distributors which are received through openings in the floor of the filter tank and connect with pipes or a plenum space beneath the floor. It is particularly advantageous that the underdrain distributors fit closely to the floor and that they uniformly distribute the backwash air and/or water over the entire area of the filter bed. Examples of such stainers and underdrain distributors are discussed in U.S. Pat. Nos. 3,730,348 and 4,214,992.

While the heretofore proposed strainers and underdrain distributors have been effective in directing backwash air and/or water upwardly through the filter bed, they have resulted in what, in essence, is a point source of the backwash air and/or water. In so doing, the backwash air and/or water is not uniformly distributed over the entire area of the filter bed and thereby creates dead spots therein.

SUMMARY OF THE INVENTION

In accordance with the present invention, a unique air/water underdrain distributor assembly is provided which provides a uniform distribution of the backwash air and/or water and eliminates dead spots in the filter bed. The underdrain distributor of the present invention directs backwash air and/or water through evenly spaced openings over the entire bottom of the filter bed rather than through concentrated groups of openings. The backwash air and backwash water are directed through specifically designated openings. The underdrain distributor of the present invention provides precise metering of the backwash air and water.

More specifically, the underdrain distributor assembly of the present invention includes a distribution member attached to and extending upwardly from the upper surface of the floor supporting the filter bed. The distributor member has a substantially horizontal surface spaced above the floor and a wall extending therefrom towards the floor so as to define a distributor chamber which communicates with an opening extending through the floor. A plurality of first and second evenly spaced openings extend through the horizontal surface, which openings respectively direct backwash water and backwash air from the distributor chamber upwardly therethrough. Each of the first openings is provided with a shroud, extending downwardly from the horizontal surface, having a first end portion in fluid communication with the first opening and a second end portion in communication with an intermediate portion of the distributor chamber. As backwash water and backwash air are directed upwardly through the opening in the floor into distributor chamber, the backwash air collects in a gas compartment formed in an upper portion of the distributor chamber, and is directed therefrom through the uniformly spaced second openings upwardly through the filter bed, and the backwash water collects in a backwash water compartment, formed in a lower portion of the distributor chamber, and is directed upwardly through the uniformly spaced shrouds and first openings through the filter bed. The first openings are preferably larger in size than the second openings.

In accordance with a preferred embodiment of the invention, a substantially horizontal base plate member is secured to the wall of the distributor member so as to define the bottom of the distributor chamber. The base plate member has an opening formed therein in communication with the opening in the floor. The distributor member is preferably provided with a plurality of downwardly extending support ribs having lower surfaces which contact the base plate member and thereby add rigidity to the assembly.

A preferred embodiment of the invention also includes a cover plate member positioned above and in close proximity to the upper surface of the distributor member. The cover plate member is provided with openings formed therein which communicate with the first and second openings in the distributor member. The openings formed in the cover plate member are sized so as to permit the passage of backwash water and backwash air therethrough and prevent the passage of the particles which comprise the filter bed therethrough. The distributor member, base plate member and the cover plate member are preferably formed from a suitable plastic material.

In accordance with a preferred embodiment of the invention, a metering tube is provided for partitioning the backwash air and water flow rates entering the distributor chamber.

In accordance with a preferred embodiment of the invention, the distributor member is secured to the floor in a unique manner which will hereinbelow be described in detail.

The invention, both as to its construction and method of operation, will be understood by reference to the following description taken in conjunction with the accompanying drawings.

DESCRIPTION OF THE DRAWINGS

FIG. 1 is a schematic elevational view, partially in section, illustrating a filter incorporating the underdrain distributor assembly of the present invention;

FIG. 2 is a cross-sectional elevational view illustrating a preferred embodiment of the underdrain distributor assembly of the present invention;

FIG. 3 is a bottom plan view of the distributor member of the underdrain distributor assembly as shown in FIG. 2;

FIG. 4 is a cross-sectional view taken along line 4—4 in FIG. 3;

FIG. 5 is a cross-sectional view taken along line 5—5 in FIG. 3;

FIG. 6 is a cross-sectional view taken along line 6—6 in FIG. 3;

FIG. 7 is a top plan view of the base plate member of the underdrain distributor assembly as shown in FIG. 2;

FIG. 8 is a cross-sectional view taken along line 8—8 in FIG. 7;

FIG. 9 is a bottom plan view of the cover plate member of the underdrain distributor assembly as shown in FIG. 2;

FIG. 10 is a cross-sectional view taken along line 10—10 in FIG. 9;

FIG. 11 is a cross-sectional view similar to FIG. 5 showing an alternative construction of the shroud.

DESCRIPTION OF PREFERRED EMBODIMENTS

Figure 12:
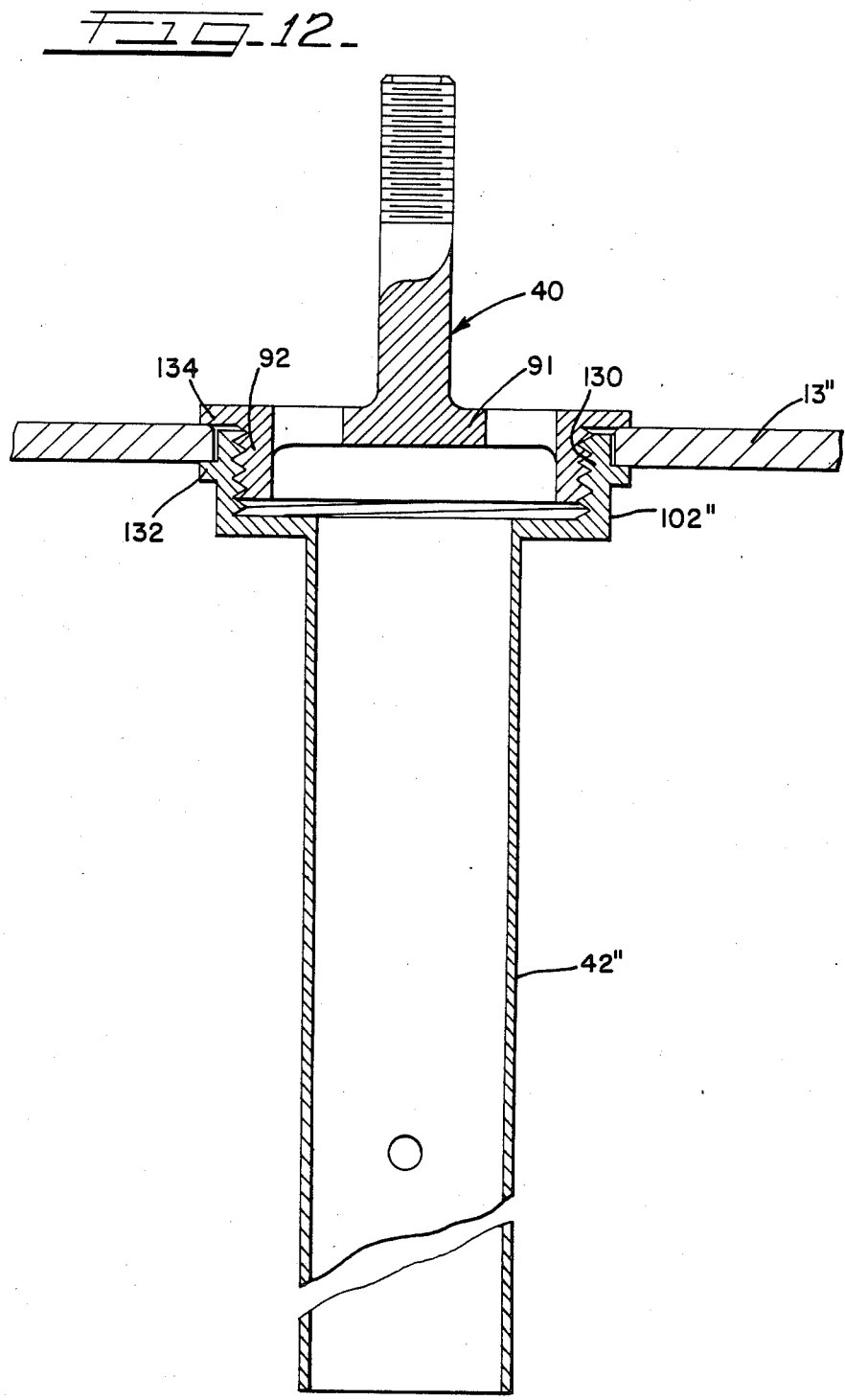
FIG. 12 is a cross-sectional elevational view illustrating an alternative embodiment of the invention for utilization of the invention in a vessel having a steel floor.

Referring now to the drawings, and more particularly to FIG. 1, there is illustrated a simplified exemplary filter 10 utilizing an underdrain distributor assembly of the present invention. Filter 10 has a filter bed 12 through which the raw liquid to be treated is passed during the service cycle to remove solid foreign materials therefrom. Treated water from filter 10 is passed to service. After filter bed 12 has become clogged with foreign particles removed from the raw liquid, a backwash cycle is iniated wherein pressurized gas and/or backwash water is passed upwardly therethrough to dislodge foreign matter in bed 12.

More specifically, filter 10 comprises a filter tank 11 having a false bottom concrete floor 13 dividing tank 11 into an inlet chamber 14 and an outlet or underdrain chamber 15. Filter bed 12 of suitable filter media, such as sand or the like, is supported in inlet chamber 14 above floor 13. An inlet pipe 16 extends into and communicates with inlet chamber 14 to carry raw liquid into chamber 14. An outlet pipe 17 communicates with outlet chamber 15 to pass the treated liquid from chamber 15 to service. A gas scour inlet pipe 18, has one end thereof in fluid communication with outlet pipe 17 and the other end thereof in fluid communication with a source of pressurized gas (not shown). A backwash inlet pipe 19 has one end thereof in fluid communication with outlet pipe 17 and the other end thereof in fluid communication with a backwash liquid storate tank (not shown). A transfer pipe 20 communicates with inlet pipe 16 to carry backwash liquid from chamber 14. Conventional control valves 21, 22, 23, 24 and 25 are associated respectively with pipes 16, 17, 18, 19 and 20 to control fluid flow therethrough.

A plurality of air/water underdrain distributor assemblies 30, embodying features of the present invention, are secured to and extend through openings 31 formed in floor 13. Referring to FIGS. 2–10, and in particular to FIG. 2, distributor assembly 30, constructed in accordance with a preferred embodiment of the invention, includes a distribution member 32, a base plate member 34, a cover plate member 36, an insert member 38, a bolt-cap assembly 40 and a metering tube member 42.

Distributor member 32 is formed so as to define a substantially horizontal surface 44 spaced above floor 13 and a peripheral wall 46 extending downwardly towards floor 13 so as to define a distributor chamber 48 in fluid communication with opening 31. As best seen in FIG. 3, horizontal surface 44 has a plurality of spaced apart first openings 50 and second openings 52 formed therein. In accordance with a preferred embodiment of the invention, first openings 50 are larger in size than second openings 52 and each first opening has a second opening associated therewith spaced a short distance therefrom. Each of the openings 50 is provided with a downwardly extending shroud 54 having a first end portion 56 in fluid communication with a corresponding opening 50 and a second end portion 58 in fluid communication with an intermediate portion of distributor chamber 48. Distributor member 32 may be formed which inwardly extends gussets 60 to add rigidity thereto.

Distributor member 32 is further formed with a central opening 62 through which a securing means extends in a manner which will hereinbelow be discussed. A plurality of support ribs 64 extend downwardly from horizontal surface 44 equadistantly spaced from opening 62. As best seen in FIG. 4, support ribs 64 are formed with a lower surface 68.

Referring to FIGS. 2, 7 and 8, base plate member 34 is formed so as to define a substantially horizontal surface 70 having a centrally disposed opening 72 formed therein. A peripheral flange 74 extends upwardly from surface 70 and is snuggly received within wall 46 of distributor member 32. Base plate member 34 is secured to distributor member 32 in closing relationship thereto so as to define chamber 48. As best seen in FIG. 2, surfaces 68 of supports ribs 64 are in contact with the upper surface 70 of base plate member 34.

Referring to FIG. 2, a hollow insert member 38 extends through opening 31 in concrete floor 13. Insert member 38 has an upper and portion 80 in fluid communication with inlet chamber 14 and a lower end portion 82 in fluid communication with outlet chamber 15. Upper end portion 80 is formed with an internally threaded portion 84 and lower end portion 82 is formed with an internally threaded portion 86.

Distributor member 32 and base plate member 34 are secured in place above floor 13, in accordance with a preferred embodiment of the invention, by a bolt-cap assembly 40. Assembly 40 comprises a lower cap portion 91 having a downwarding extending external threaded portion 92 which is received by threaded portion 84. Cap portion 91 is formed with a plurality of openings 93 through which insert member 38 communicates with distributor chamber 48. Extending upwardly from a central portion of cap portion 91 is a stem portion 94 having a threaded upper end 95 which extends through opening 62 in distributor member 32. A locking nut 96 is received about end 95 to selectively retain distribution member 32 and base plate member 34 in place above floor 13. As is quite apparent, upon removal of locking nut 96, distribution member 32 and base plate member 34 may be removed for repair and/or replacement. In accordance with a preferred embodiment of the invention, an air metering tube member 42 extends between insert member 38 and outlet chamber 15. Member 42 has an upper end portion 102 and a lower end portion 106 which extends into outlet chamber 15. Upper end portion 102 extends through a fitting member 104 into insert member 38. Fitting 104 is provided with an externally threaded flange portion 105 which is received in threaded portion 86 of insert member 38. Flange portion 105 is provided with one or more weep holes 107. Fitting 104 is provided with an upwardly extending externally threaded tubular portion 109 through which the upper end portion 102 slidably extends. A locking member 110 is selectively received about tubular portion 109 to clamp tube member 42 in a preselected vertical orientation with respect to outlet chamber 15. One or more air metering holes 108 are formed through an intermediate portion of metering tube member 42.

In accordance with a preferred embodiment of the invention, a cover plate member 36 may be positioned above and in close proximity to the upper surface of horizontal surface 44 of distributor member 32. Referring to FIGS. 2, 9 and 10, cover plate member 36 has a horizontal surface 112 and a downwardly extending peripheral wall 114. Member 36 is positioned in covering relationship to horizontal surface 44 with inner surface of wall 114 in contact with the outer surface of wall 46. A plurality of openings 116 is formed through horizontal surface 112 in communication with a cooperating pair of first and second openings 50 and 52. Openings 116 are provided with screen means 118 which permits the passage of water and gas therethrough and prevents the passage of the particles which comprise the filter bed 12 therethrough. Screen means 118 may alternatively be a separate screen secured to horizontal surface 112 or integrally formed in horizontal surface 112. Openings 116 are preferrably formed with downwardly extending projection 117 to space and support horizontal surface 112 a short distance above horizontal surface 44. Cover plate member is secured in place by assembly 40 extending through opening 119 formed through a central portion of surface 112.

Members 32, 34, and 36 are preferably integrally molded from a suitable plastic material. Further, in accordance with a preferred embodiment of the invention, the upper surface of horizontal surface 44 may be formed with upwardly projecting pins 120 which are received and heat welded in cooperating openings 122 formed in horizontal surface 112.

As seen in FIG. 1, a plurality of assemblies 30 is preferrably positioned adjacent one another so as to substantially cover the entire floor 13.

In operation of filter 10, during the filtering or service cycle, valves 21 and 22 are open and valves 23, 24 and 25 are closed. Raw liquid passes through inlet pipe 16 into inlet chamber 14 and then passes downwardly through filter bed 12. The filtered liquid passes through openings 50 and 52 into chambers 48 of the distributor assemblies 30 and then through metering tube members 42 into outlet chamber 15 and out through outlet pipe 17 to service. After filter bed 12 has become clogged with foreign particles removed from the raw liquid, a backwash cycle is initiated. During the backwash cycle, a backwash liquid is passed upwardly through the filter media. The backwash liquid is typically accompanied with or preceeded by an upward flow of a backwash gas such as air. The description which hereinbelow follows shall be of a system wherein the backwash liquid is accompanied with the backwash air scour. However, the present invention contemplates that the backwash liquid and backwash air may be separately passed through the filter bed if circumstances warrant.

The backwash cycle is initiated by opening valves 23, 24 and 25 and closing valves 21 and 22. A pressurized gas, such as air, is bubbled through pipes 18 and 17 into underdrain chamber 15. Filtered liquid from a storage tank (not shown) passes through pipes 19 and 17 into underdrain chamber 15. The backwash air and backwash water separate in underdrain chamber 15 forming an upper air chamber and a lower water chamber as depicted in FIG. 2. Metering hole 108 and weep hole 107 are sized such that the height of the air chamber below floor 13 is a predetermined distance "h" below metering hole 108 for a given combination of air flow rate and water flow rate into chamber 15. The air is metered through holes 107 and 108 and the water rises through the lower portion 106 of metering tube member 42. The air and water are mixed in the upper portion 102 of metering tube member 42. The mixture of air and backwash liquid from chamber 15 is directed upwardly through metering tube members 42 and openings 93 into distribution chambers 48 of the distribution assemblies 30. The air and backwash liquid in chamber 48 separate such that the air accumulates in a gas compartment in an upper portion of chamber 48 and the backwash liquid collects in a backwash liquid compartment in a lower portion of chamber 48. For reasons which will herein become apparant, the level of the interface between the air and the backwash liquid is determined by the relative size and the number of the openings 50 and 52 and the air and water flow rates. In accordance with the invention, these parameters are adjusted so that during a normal backwash cycle the level of the interface is above the lower ends of shrouds 54.

The air from the gas compartment rises through openings 52 and 116 and is distributed uniformly upward through the filter bed 12. The air passing through the filter bed 12 agitates the bed and causes the foreign particles which have collected therein to become disengaged from the filter media. The backwash liquid from the backwash liquid compartment rises through shroud 54 and openings 50 and 116 and is distributed uniformly upward through the filter bed 12. The flow of backwash liquid through the filter bed 12 removes the disengaged foreign material accumulated therein during the service cycle. The air and backwash liquid passing through the bed, along with the disengaged foreign material, are removed from tank 11 through transfer pipe 20 to drain (not shown).

The vertical adjustment of metering tube member 42 is effective to precisely adjust distance "h" and thereby control the relative air and water flow rates passing through the system.

The distributor assembly 30 uniformly distributes the backwash air and liquid over the entire bottom of the filter bed and substantially avoids dead spots therein. The distributor assembly 30 constructed in accordance with the present invention is structurally strong and yet relatively inexpensive to manufacture and install.

Referring to FIG. 11, an alternative construction of the shrouds 54 is shown and designated by the numeral 54'. Shroud 54' is similar in construction to shroud 54 except that the lower end thereof extends downwardly to an elevation substantially equal to the elevation of the lower edge of wall 46. Shroud 54' is provided with at least one opening 124 formed therein which communicates with the backwash liquid compartment of the distributor chamber 48. The operation of the distributor assembly 30 which incorporates shrouds 54' operates the same as the assembly which incorporates shrouds 54 with the exception that backwash liquid passes through opening 124 during the backwash cycle. Also, the lower edge of shrouds 54'contact surface 70 and provide additional support for the assembly.

Referring to FIG. 12, an alternative embodiment of the invention is shown for connecting the distribution assembly 30 to a steel floor 13". In this embodiment a specially designed metering tube member 42" is rigidly secured to bolt-cap assembly 40 in a manner which sandwiches floor 13" therebetween. The upper end 102" of tube 42" defines an internally threaded portion 130 of increased diameter having an outwardly extending annular flange 132 spaced a short distance from the upper edge thereof. Threaded portion 92 of assembly 40 is received in threaded portion 130 so as receive floor 13" between flange 132 and an outwardly extending portion 134 of cap portion 91, as seen in FIG. 12. The distributor assembly 30 is secured to bolt-cap assembly 40 in the same manner as discussed hereinabove.

The filter assembly 10, as disclosed above is for exemplary purposes and should not be construed to indicate that the distribution assembly 30 disclosed therewith do not have utility in conjunction with other types of filtering apparatus. While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. In an apparatus including a filter bed supported above a floor defining an inlet chamber thereabove and an outlet chamber therebelow; an improved air/water underdrain distributor assembly comprising: a distribution member attached to the upper surface of said floor, said distributor member having a substantially horizontal surface spaced above said floor and a wall extending downwardly therefrom towards said floor so as to define a distributor chamber in communication with an opening extending through said floor; first and second spaced apart openings extending through said horizontal surface; a shroud extending downwardly from said first openings having a first end portion in fluid communication with said first openings and a second end portion in communication with an intermediate portion of said distributor chamber; and means for directing backwash water and gas into said outlet chamber upwardly through said opening in said floor into said distributor chamber such that gas collects in a gas compartment formed in an upper portion of said distributor chamber and is directed through said second openings upwardly through said filter bed and backwash water collects in a backwash water compartment formed in a lower portion of said distributor chamber and is directed upwardly through said shrouds and said first openings through said filter bed.

2. The invention as defined in claim 1 wherein said first openings are larger in size than said second openings.

3. The invention as defined in claim 1 wherein said second ends of said shrouds terminate at an intermediate elevation within said distributor chamber.

4. The invention as defined in claim 1 wherein said second ends of said shrouds extends into said lower portion of said distributor chamber and are provided with at least one opening formed therein which communicates with said intermediate portion of said distributor chamber.

5. The invention as defined in claim 1 further including a substantially horizontal base plate member positioned adjacent to said wall of said distributor member so as to define the bottom of said distributor chamber, said base plate member having an opening formed therein in communication with said opening in said floor.

6. The invention as defined in claim 5 wherein said base plate member is provided with an upwardly extending flange which is positioned adjacent to a bottom portion of said wall.

7. The invention as defined in claim 5 wherein said distributor member is provided with a plurality of downwardly extending support ribs which are formed with a lower surface which contacts said base plate member.

8. The invention as defined in claim 1 wherein each of said first openings has a corresponding second opening positioned a short distance therefrom.

9. The invention as defined in claim 1 further including a cover plate member positioned above and in close proximity to the upper surface of said distributor member, said cover plate member having openings formed therein which communicate with said first and second openings in said distributor member.

10. The invention as defined in claim 9 wherein said openings formed in said cover plate member are provided with means for permitting the passage of water and gas therethrough and preventing the passage of the particles which comprise the filter bed therethrough.

11. The invention as defined in claim 10 wherein said means is an integrally molded screen extending across said opening.

12. The invention as defined in claim 11 wherein said cover plate member is provided with a downwardly extending flange which is received adjacent an upper portion of said wall.

13. The invention as defined in claim 12 wherein said distributor member and said cover plate member are formed of a plastic material.

14. The invention as defined in claim 13 wherein said distributor member is provided with a plurality of upwardly extending pin members which are received in corresponding openings formed in said cover plate member.

15. The invention as defined in claim 14 wherein said pin members are heat welded to said cover plate member.

16. The invention as defined in claim 1 wherein said opening extending through said floor is provided with a hollow insert member extending therethrough having an upper end portion in communication with said inlet chamber and a lower end portion in communication with said outlet chamber.

17. The invention as defined in claim 16 including securing means for securing said distributor member to said insert member.

18. The invention as defined in claim 17 wherein said securing means includes a bolt-cap assembly having a threaded stem portion extending upwardly through an opening in said distributor member and a locking nut received about said stem portion for retaining said distributor member in place above said floor.

19. The invention as defined in claim 18 wherein said bolt-cap assembly having a threaded cap portion which is threadedly received by a said upper end portion of said insert member in covering relationship thereto, said cap portion having a plurality of openings formed therein.

20. The invention as defined in claim 16 further including an open-ended gas metering tube member having an upper end portion extending upwardly into said insert member and a lower end portion extending downwardly into said outlet chamber, said lower end portion having an opening formed therein for receipt of gas from said outlet chamber therethrough.

21. The invention as defined in claim 20 wherein said gas metering tube member being slidably received in said insert member so as to permit selective vertical adjustment of the elevation of said opening formed therein in said outlet chamber.

22. The invention as defined in claim 21 including means for retaining said gas metering tube in a preselected position relative to said insert member.

23. The invention as defined in claim 22 wherein said means for retaining said gas metering tube includes a fitting member secured to said lower end portion of said insert member having an upstanding tubular portion for receipt of said gas metering tube therethrough.

24. The invention as defined in claim 23 further including a locking member received about said tubular portion for selectively clamping said gas metering tube to said hollow portion.

25. The invention as defined in claim 24 wherein said fitting member is provided with a weep hole formed therein.

* * * * *